(12) United States Patent
Haider et al.

(10) Patent No.: US 9,729,320 B2
(45) Date of Patent: Aug. 8, 2017

(54) APPARATUS AND METHOD FOR SOFTWARE ENABLED ACCESS TO PROTECTED HARDWARE RESOURCES

(71) Applicant: Cavium, Inc., San Jose, CA (US)

(72) Inventors: Amer Haider, Saratoga, CA (US); Muhammad Raghib Hussain, Saratoga, CA (US); Richard Eugene Kessler, Northborough, MA (US)

(73) Assignee: Cavium, Inc., San Jose, CA (US)

( * ) Notice: Subject to any disclaimer, the term of this patent is extended or adjusted under 35 U.S.C. 154(b) by 0 days.

(21) Appl. No.: 14/630,554

(22) Filed: Feb. 24, 2015

(65) Prior Publication Data

US 2015/0242655 A1   Aug. 27, 2015

Related U.S. Application Data

(60) Provisional application No. 61/944,505, filed on Feb. 25, 2014.

(51) Int. Cl.
| | |
|---|---|
| *G06F 1/26* | (2006.01) |
| *G06F 11/00* | (2006.01) |
| *G08B 13/00* | (2006.01) |
| *G08B 21/00* | (2006.01) |
| *G08B 29/00* | (2006.01) |
| *H04L 9/08* | (2006.01) |
| *G06F 21/72* | (2013.01) |
| *G06F 21/71* | (2013.01) |
| *G06F 21/70* | (2013.01) |

(52) U.S. Cl.
CPC ............ *H04L 9/0894* (2013.01); *G06F 21/72* (2013.01); *G06F 21/70* (2013.01); *G06F 21/71* (2013.01); *H04L 9/0897* (2013.01)

(58) Field of Classification Search
CPC .......... G06F 21/70; G06F 21/71; G06F 21/72; G06F 1/26; G06F 11/00; H04L 9/0894; H04L 9/0897; G08B 13/00; G08B 21/00; G08B 29/00
See application file for complete search history.

(56) References Cited

U.S. PATENT DOCUMENTS

| | | | | |
|---|---|---|---|---|
| 5,058,164 A | * | 10/1991 | Elmer | G06F 12/1408 380/277 |
| 5,764,761 A | * | 6/1998 | Vicard | G06F 21/71 713/168 |
| 6,654,909 B1 | * | 11/2003 | Quach | G06F 11/073 714/30 |
| 8,171,295 B2 | * | 5/2012 | Munetoh | G06F 21/52 713/167 |
| 8,356,194 B2 | * | 1/2013 | Carlson | G06F 1/32 713/300 |

(Continued)

FOREIGN PATENT DOCUMENTS

FR   EP 0325506 A1  *  7/1989  ......... G06Q 20/3558

*Primary Examiner* — Jayesh Jhaveri
(74) *Attorney, Agent, or Firm* — Cooley LLP

(57) ABSTRACT

A semiconductor includes a set of protected hardware resources, where at least one protected hardware resource stores a secure key. The semiconductor also includes a computation kernel and a memory to store a resource enablement module executed by the computation kernel. The resource enablement module selectively enables a protected hardware resource in response to a delivered key corresponding to the secure key.

18 Claims, 3 Drawing Sheets

(56) References Cited

U.S. PATENT DOCUMENTS

| | | | | |
|---|---|---|---|---|
| 8,856,513 | B2* | 10/2014 | Srinivasan | G06F 21/71 713/156 |
| 2001/0033012 | A1* | 10/2001 | Kommerling | G06F 21/86 257/679 |
| 2003/0200435 | A1* | 10/2003 | England | G06F 21/445 713/172 |
| 2004/0202319 | A1* | 10/2004 | Hussain | H04L 63/0428 380/33 |
| 2005/0257016 | A1* | 11/2005 | Boles | G06F 12/1491 711/163 |
| 2007/0168676 | A1* | 7/2007 | Fayad | G06F 21/72 713/185 |
| 2009/0119508 | A1* | 5/2009 | Lewis | G06F 21/71 713/170 |
| 2009/0158011 | A1* | 6/2009 | Jennings | G06F 21/74 712/220 |
| 2010/0306107 | A1* | 12/2010 | Nahari | G06Q 20/02 705/44 |
| 2011/0067110 | A1* | 3/2011 | Markey | G06F 21/575 726/26 |
| 2012/0027199 | A1 | 2/2012 | Haider et al. | |
| 2013/0151848 | A1* | 6/2013 | Baumann | H04L 9/3263 713/164 |
| 2014/0068133 | A1* | 3/2014 | Tkacik | G06F 13/1694 710/308 |
| 2014/0137271 | A1* | 5/2014 | Hyde | G06F 12/0238 726/30 |

* cited by examiner

APPARATUS AND METHOD FOR SOFTWARE ENABLED ACCESS TO PROTECTED HARDWARE RESOURCES

CROSS REFERENCE TO RELATED APPLICATIONS

This application claims priority to U.S. Provisional Patent Application No. 61/944,505 filed Feb. 25, 2014, which is incorporated herein by reference.

FIELD OF THE INVENTION

This invention relates generally to semiconductor chips. More particularly, this invention relates to software enabled access to protected hardware resources of a semiconductor chip.

BACKGROUND OF THE INVENTION

Semiconductor chips are typically sold with a full set of available hardware resources. In some cases, semiconductor chips are sold with a sub-set of hardware resources available, where unavailable resources are permanently disabled through some type of physical mechanism.

SUMMARY OF THE INVENTION

A semiconductor includes a set of protected hardware resources, where at least one protected hardware resource stores a secure key. The semiconductor also includes a computation kernel and a memory to store a resource enablement module executed by the computation kernel. The resource enablement module selectively enables a protected hardware resource in response to a delivered key corresponding to the secure key.

A computer includes a network interface circuit in communication with a key distribution module. A semiconductor is coupled to the network interface circuit. The semiconductor includes a set of protected hardware resources, where at least one protected hardware resource stores a secure key. The semiconductor further includes a computation kernel and a memory to store a resource enablement module executed by the computation kernel. The resource enablement module selectively enables a protected hardware resource in response to a delivered key from the key distribution module that corresponds to the secure key.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
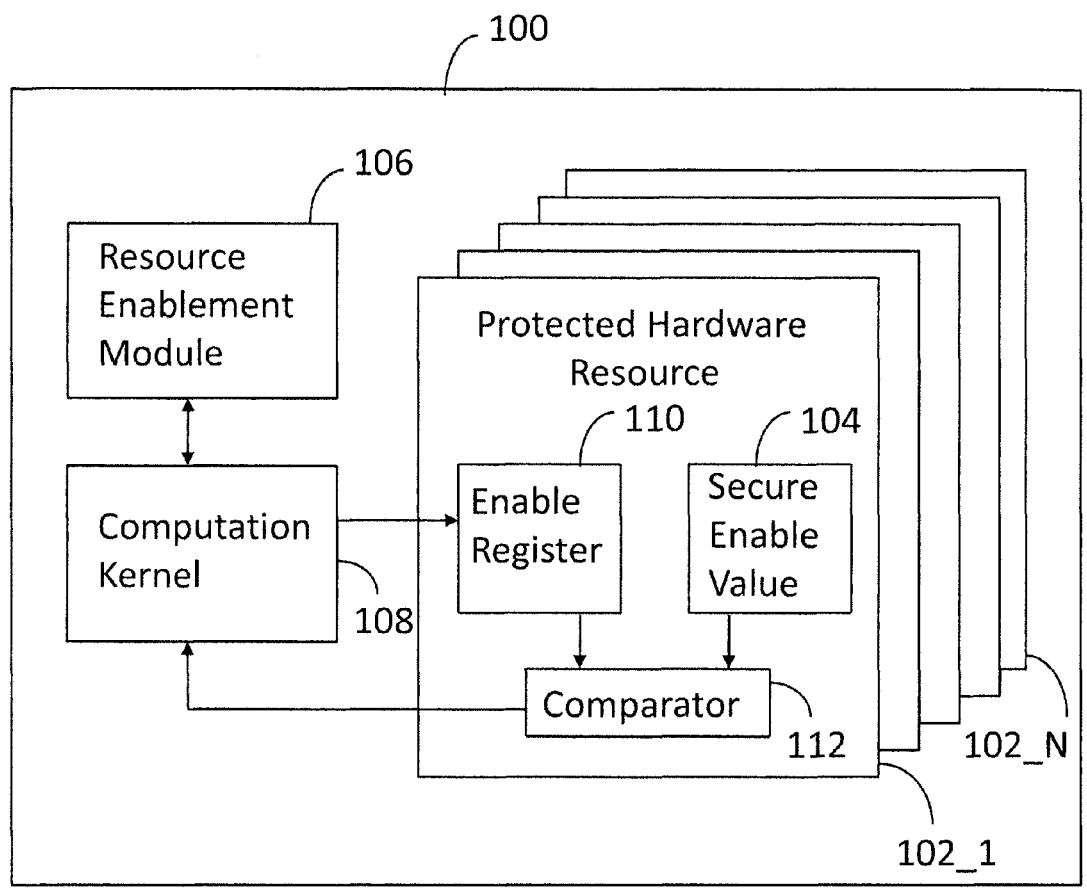
FIG. 1 illustrates a semiconductor chip with software enabled access to protected hardware resources.

FIG. 1 illustrates a semiconductor chip 100 configured in accordance with an embodiment of the invention. The chip 100 includes a set of protected hardware resources 102_1 through 102_N. Each protected hardware resource is a discrete computational resource, such as a processing core, an encryption block, a digital signal processor, a graphics processor, and the like. Each protected hardware resource 102 stores a secure enable value 104. For example, the secure enable value 104 may be a key securely written and stored at the time that the chip 100 is manufactured. The protected hardware resource is only enabled if a delivered key corresponding to the secure key is received by the chip 100.

In one embodiment, the chip includes memory storing a resource enablement module 106. The resource enablement module 106 includes executable instructions to implement operations of the invention. A computation kernel 108 executes the resource enablement module 106. The computation kernel 108 may be implemented as a minimalistic computation core operative to enable and supervise protected hardware resources.

In one embodiment, the resource enablement module 106 operating on the computation kernel 108 receives a delivered key and writes it to an enable register 110 of the protected hardware resource 110. If the delivered key corresponds to the secure key, an indication is provided from the comparator 112 to the resource enablement module 106 executing on the computation kernel 108.

Figure 2:
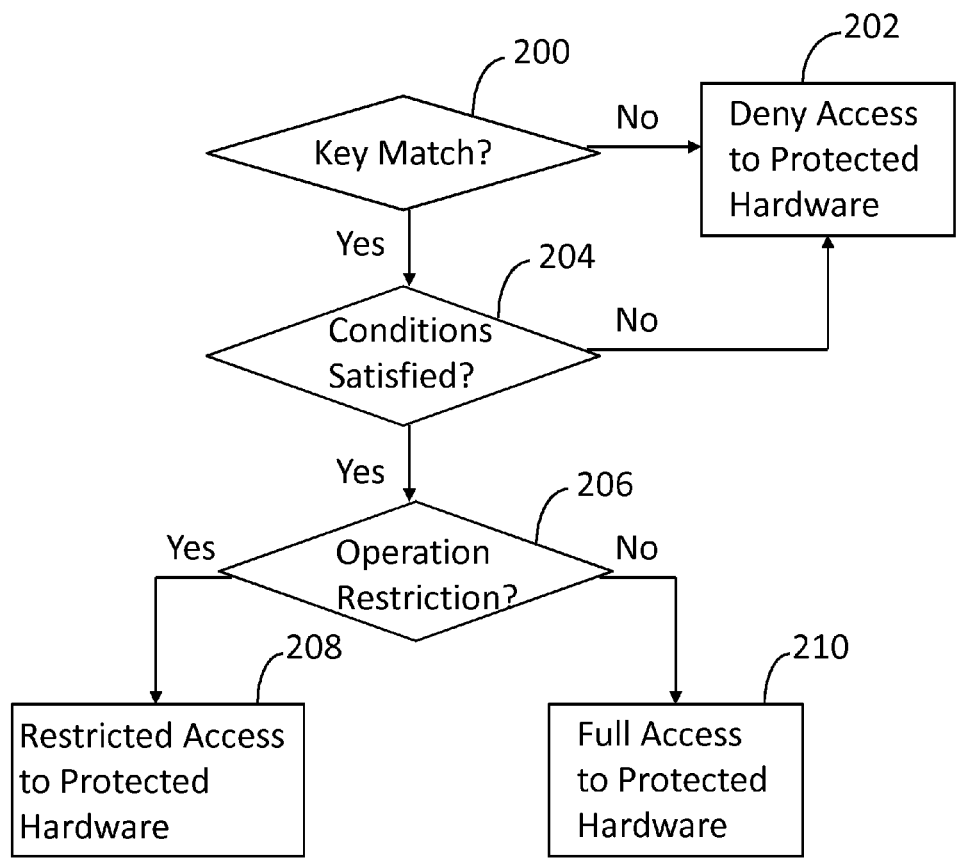
FIG. 2 illustrates processing operations associated with an embodiment of the invention.

These operations are more fully appreciated with reference to FIG. 2. FIG. 2 illustrates processing operations associated with an embodiment of the resource enablement module 106. A key match is tested at block 200. If a key match does not exist, then access to the protected hardware resource is denied 202. If a key match exists, then an embodiment of the invention allows for full access to the protected hardware resource. However, in an alternate embodiment, as shown in FIG. 2, an additional condition is tested at block 204. If the condition is not satisfied, then access to the protected resource is denied 202. Any number of conditions may be tested. For example, the condition may be a time window. That is, the condition may specify that the protected hardware resource may only be accessed in a time window defined by a start time and an end time. Another condition may be a geo-location parameter. For example, the chip 100 may have a GPS block that delivers geo-location parameters which are compared to permitted geo-location parameters. Alternately, the chip 100 may access geo-location information by looking up an internet protocol address through a WHOIS service to retrieve a physical address, which may be compared to permissible geo-location regions.

If a condition is satisfied, then full access may be provided to the protected hardware resource. However, as shown in FIG. 2, an additional test for an operation restriction may be applied in block 206. The operation restriction may relate to any number of operating parameters of the chip. If there are no operation restrictions, then full access to the protected hardware resource is provided 210. If an operation restriction applies, then restricted access to the protected hardware resource is provided 208. The restricted access may be in the form of modulating physical parameters of the chip. For example, the power consumption, cycle frequency or quality of service supported by the chip may be modulated. The restriction may be in the form of a permanent restriction (e.g., a set cycle frequency) or an impermanent restriction coupled with denied access to the resource (e.g., a specified number of allowed cycles, after which the resource is disabled). Alternately, permitted software applications may be gated. For example, only specified application programs may be allowed to execute or limits may be placed on the number of instances of virtual machines.

The processing of FIG. 2 may be altered in any number of ways. For example, resource enablement may be based upon a key match alone. Alternately, resource enablement may be based upon a key match and an operation restriction test 206, but not a condition restriction test 204.

Figure 3:
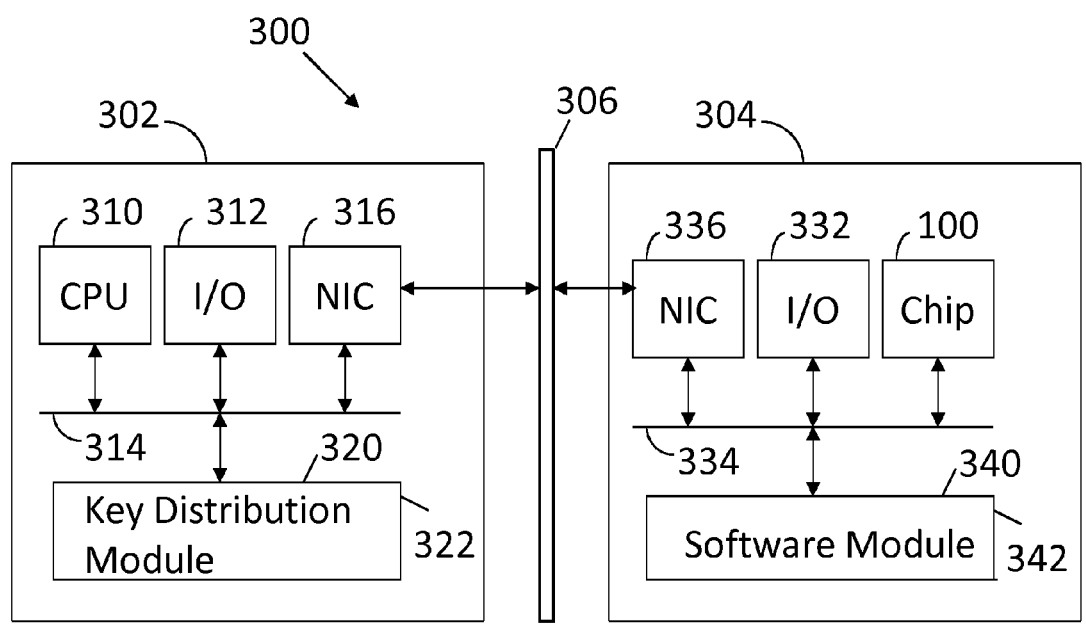
FIG. 3 illustrates a system incorporating a semiconductor chip with protected hardware resources.

FIG. 3 illustrates a system 300 configured in accordance with an embodiment of the invention. The system 300 includes a first machine 302 and a second machine 304 connected by a network 306, which may be any wired or wireless network or combinations thereof. The first machine 302 includes standard components, such as a central processing unit 310 connected to input/output devices 312 via a bus 314. The input/output devices 312 may include a keyboard, mouse, display and the like. A network interface circuit 316 may also be connected to bus 314. A memory 320 is also connected to bus 314. The memory 320 stores a key distribution module 322. The key distribution module 322 stores keys corresponding to secure enable values stored by manufactured protected hardware resources 102. Thus, a chip manufacturer may control machine 302 and selectively deliver key values that allow protected hardware resources to be unlocked.

The second machine 304 includes a chip 100 of the type discussed in connection with FIG. 1. The chip 100 may be connected to input/output devices 332 via bus 334. A network interface circuit 336 is connected to bus 334. The network interface circuit receives delivered keys from the key distribution module 322. A memory 340 is also connected to bus 334. The memory 340 stores one or more software modules 342. The software modules 342 are executed by the chip 100 in accordance with the protected hardware resources that have been unlocked on chip 100.

Thus, the invention provides incremental control of protected hardware resources. Those hardware sources may be turned on through a delivered key that matches a secure enable value. However, the turned on resource may have accompanying restrictions, such as time based restrictions, performance restrictions and the like. In this way, the invention provides a metered semiconductor resource that can be viewed as "silicon as a service". That is, the user only needs to pay for required computation power. The computation power is flexibly delivered with or without restrictions. This approach is advantageous for the semiconductor manufacturer because a single die can be manufactured and flexible pricing options may be offered.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A semiconductor, comprising:
a plurality of protected hardware resources, wherein each protected hardware resource stores a secure key written to the semiconductor by a manufacturer of the semiconductor and wherein the plurality of protected hardware resources include different discrete computational resources selected from a processing core, an encryption block, a digital signal processor and a graphics processor;
a computation kernel; and
a memory to store a resource enablement module with instructions executed by the computation kernel;
wherein the resource enablement module selectively enables a protected hardware resource in response to a delivered key matching the secure key, wherein the delivered key is received from the manufacturer via a network, and wherein the resource enablement module further tests for an operation restriction corresponding to one or more operating parameters of the semiconductor resulting in full access or restricted access to the protected hardware resource.

2. The semiconductor of claim 1 wherein the resource enablement module selectively enables the protected hardware resource in response to a combination of the delivered key matching the secure key and the satisfaction of a specified condition.

3. The semiconductor of claim 2 wherein the resource enablement module denies access to the protected hardware resource when the specified condition is not satisfied.

4. The semiconductor of claim 2 wherein the specified condition is a time window.

5. The semiconductor of claim 2 wherein the specified condition is permitted geo-location parameters for the semiconductor.

6. The semiconductor of claim 1 wherein the operation restriction includes modulating power consumption of the semiconductor to establish required computation power.

7. The semiconductor of claim 1 wherein the operation restriction includes modulating cycle frequency of the semiconductor to establish required computation power.

8. The semiconductor of claim 1 wherein the operation restriction includes modulating quality of service supported by the semiconductor.

9. The semiconductor of claim 1 wherein the operation restriction includes gating permitted software applications.

10. The semiconductor of claim 1 wherein each protected hardware resource further comprises an enable register and a comparator.

11. The semiconductor of claim 10 wherein the resource enablement module writes the delivered key to the enable register and the comparator selectively provides an indication of a match between the delivered key and the secure key.

12. A computer, comprising:
a network interface circuit in communication with a key distribution module; and
a semiconductor coupled to the network interface circuit, wherein the semiconductor includes:
a plurality of protected hardware resources, wherein each protected hardware resource stores a secure key written to the semiconductor by a manufacturer of the semiconductor and wherein the plurality of protected hardware discrete computational resources selected from a processing core, an encryption block, a digital signal processor and a graphics processor,
a computation kernel, and
a memory to store a resource enablement module with instructions executed by the computation kernel, wherein the resource enablement module selectively enables a protected hardware resource in response to a delivered key from the key distribution module that matches the secure key, wherein the delivered key is received from the manufacturer via a network, and wherein the resource enablement module further tests for an operation restriction corresponding to one or more operating parameters of the semiconductor resulting in full access or restricted access to the protected hardware resource.

13. The computer of claim 12 wherein the resource enablement module selectively enables the protected hardware resource in response to a combination of the delivered key that matches the secure key and the satisfaction of a specified condition.

14. The computer of claim 13 wherein the resource enablement module denies access to the protected hardware resource when the specified condition is not satisfied.

15. The computer of claim 12 wherein the operation restriction includes modulating power consumption of the semiconductor to establish required computation power.

16. The computer of claim 12 wherein the operation restriction includes modulating cycle frequency of the semiconductor to establish required computation power.

17. The computer of claim 12 wherein the operation restriction includes modulating quality of service supported by the semiconductor.

18. The computer of claim 12 wherein the operation restriction includes gating permitted software applications.

* * * * *